United States Patent [19]

Wolf

[11] 4,094,688

[45] June 13, 1978

[54] METHOD AND MOLDING CORE FOR MAKING A FLEXIBLE HOLLOW MOLDED BODY WHICH IS OPEN ON A NUMBER OF SIDES

[76] Inventor: Franz-Josef Wolf, Sprudelallee 19, -6483 Bad Soden-Salmunster, Germany

[21] Appl. No.: 682,089

[22] Filed: Apr. 30, 1976

[30] Foreign Application Priority Data

Aug. 21, 1975 Japan .................................. 2537251
Feb. 18, 1976 Germany .......................... 2606528

[51] Int. Cl.² .......................... B28B 7/36; B29C 1/12
[52] U.S. Cl. .................................. 106/38.2; 264/317; 264/328; 264/334
[58] Field of Search ............... 264/317, 328, 318, 334, 264/DIG. 44; 106/38.2, 38.9

[56] References Cited

U.S. PATENT DOCUMENTS

| | | | |
|---|---|---|---|
| 1,580,518 | 4/1926 | Martine | 264/334 |
| 2,217,734 | 10/1940 | Dreyfus | 2 64/317 |
| 2,280,074 | 4/1942 | Halsall | 264/317 |
| 2,343,205 | 2/1944 | Pudelko | 264/317 |
| 3,214,504 | 10/1965 | Gemberling | 264/242 |
| 3,430,914 | 3/1969 | Clasen | 264/214 |

FOREIGN PATENT DOCUMENTS

563,192  8/1944  United Kingdom ................. 264/317

*Primary Examiner*—Donald J. Arnold
*Attorney, Agent, or Firm*—Webb, Burden, Robinson & Webb

[57] ABSTRACT

A method for making a flexible hollow molded body that is open on several sides, such as pipe manifolds, and particularly double-tee headers, T-headers, and Y-headers out of an elastic or a soft thermoplastic material, and a device therefor comprising a brittle one-piece molding core containing at least one predetermined breaking point which is so disposed that after breaking, the molding core may be withdrawn completely from the hollow molded body providing a passage therethrough that is always free and open even when the hollow molded body is bent or comprises geometric shapes that intersect one another. The material of the hollow molded body may be built up around the molded core by various methods, for example by molding or injection in a matrix, by immersion or by centrifugal immersion.

10 Claims, 8 Drawing Figures

U.S. Patent June 13, 1978 Sheet 1 of 4 4,094,688
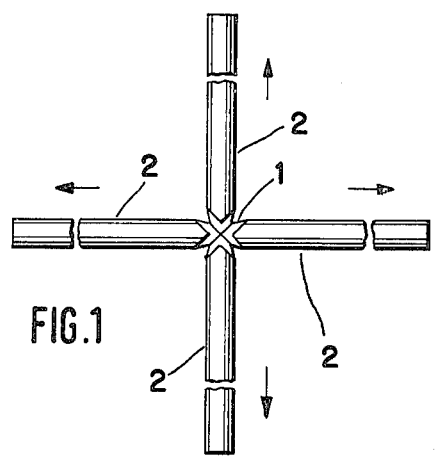
FIG.1
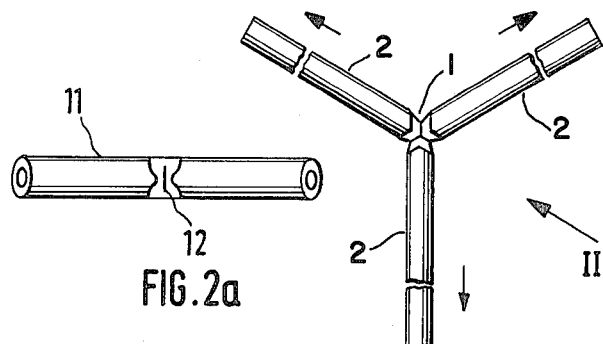
FIG.2a
FIG.2
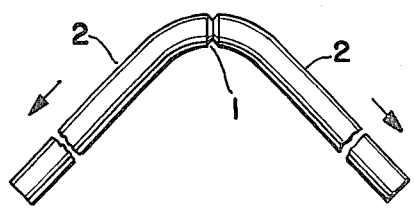
FIG.3

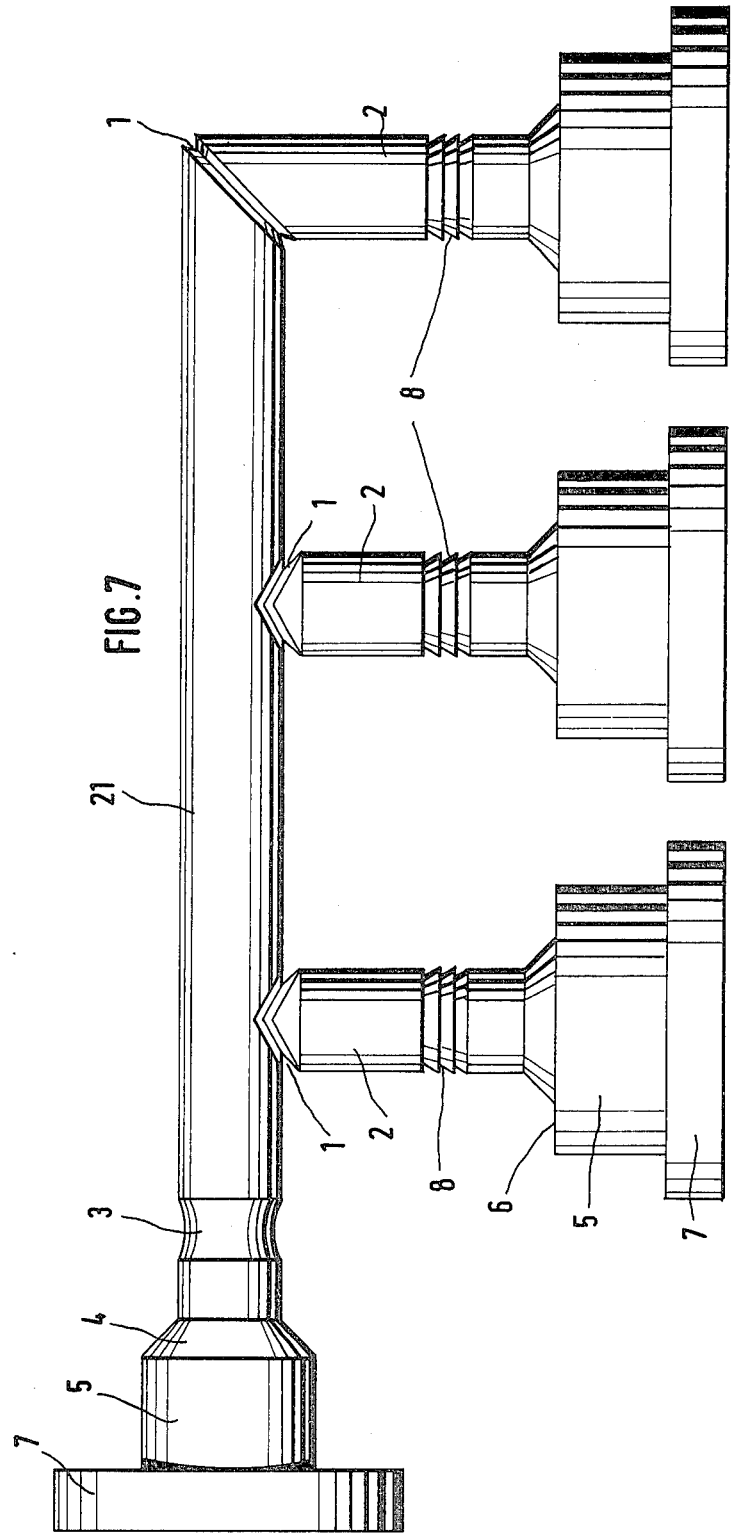

METHOD AND MOLDING CORE FOR MAKING A FLEXIBLE HOLLOW MOLDED BODY WHICH IS OPEN ON A NUMBER OF SIDES

The invention relates to a method and a device for making a flexible hollow molded body that is open on a number of sides, particularly for use in making flexible manifolds.

The problem of branching off rigid pipelines as elastically as possible arises frequently in many fields of technology.

Also related to this problem is the problem often encountered in technology of making inexpensive and tight branch lines for rigid pipelines wherein the said branch lines are supposed to be mountable both quickly and simply, and if at all possible, merely by means of insertion.

Both of these problems will be treated together in the following description under the concept of the flexible branching of rigid pipelines.

This problem of flexible branching of rigid pipeline systems concerns, for instance, those skilled in the field of laboratory techniques, the field of construction of laboratory apparatuses, and the field of regulation and adjustment at negative, sub-atmospheric, or reduced pressures. The regulating technique for negative pressure is becoming increasingly important, particularly in the motor vehicle industry.

It is an obvious solution to the problem of flexibly branching off rigid pipelines to insert branch elements that are made entirely of a flexible material, as a rule a rubber-elastic material. But this obvious solution has not found acceptance in actual practice since up to the present time it has not been possible to mass produce these branching members in such a way that in every instance a free connection will be assured between the connecting openings of the branch members. Attempts to inject such branching elements that are made of rubber by using steel molding cores were soon abandoned. The molding core was composed of individual steel legs which abutted against one another at the point of branching and were pulled out of the hollow molded body after the rubber preparation had been injected.

To be sure, it was possible in this way to make individual pieces of the flexible branching members by precision manufacturing, but in mass production it was impossible to prevent the rubber preparation that was injected into the mold from penetrating between the abutting ends of the parts of the molding core. After ejection from the mold, there remains in the thusly manufactured branching elements a more or less thick rubber structure which reproduces the area of the junction of the parts of the molding core, the said junction never being quite accurate in mass production. Frequently the branching pieces have absolutely no passage therethrough, or only a greatly reduced passage, and are unusable.

To avoid this drawback, a branching of pipes of the type mentioned has been introduced into practice which consists of relatively easily made rigid branch elements made, for instance, of hard thermoplastics or duroplastics, of glass or metal, the connections to the pipelines being made by flexible pieces of hose which are pushed, on the one hand, over the connection opening of the branching element, and on the other hand, over the opening of the line. This design for the flexible branching of rigid lines has three drawbacks when compared to the use of flexible branching members: (1) for each connecting branch two connections must be made instead of just one, thus requiring a longer assembly time; (2) for each connecting branch two transition points are required instead of just one transition point, thus increasing the danger of leakage and of tearing off; (3) branch lines of rigid pipelines made with rigid branching elements and merely elastic transition pieces have a lesser overall flexibility in space than a branching system of the same construction whose branching member consists entirely of flexible material.

A very similar problem exists, for instance, with bends in rigid pipeline systems if these bends are to exhibit a certain degree of elasticity. Bends made of a rigid pipe material that are joined to the connecting pipelines by way of straight pieces of hose again require four instead of only two connecting and sealing surfaces. In smaller bend radii, when a straight piece of hose made of a flexible material is used, and when this piece of hose is bent to form the bend, substantial flow resistance is created and there is danger of kinking or blockage due to kinking. The pipe bend made of a flexible, preferably rubber-elastic material, is also the ideal solution to this problem. But even bends of this type made of an elastic material cannot be manufactured by mass production methods for the same reasons as those described for the branching elements made of elastic material. In series production the formation of partitions formed by the flexible material that was injected into the mold cannot be avoided. The free or open passage of bends manufactured in this way cannot be guaranteed.

In view of this state of technological development it is the aim of the present invention to create a method and a device for manufacturing a flexible hollow molded body that is open on several sides which will guarantee the mass production of a hollow molded body of this type with a passage that is always free and open even when the hollow molded body is bent or comprises geometric shapes that intersect one another.

This aim is achieved by a method of the type previously mentioned which is characterized by the fact that according to the invention the hollow molded body is built up around a brittle, one-piece molding core which contains at least one predetermined breaking point, that after the preparation of the hollow molded body has cooled off and set, the hollow molded body is bent or flexed in such a way that the molding core will break at the predetermined breaking points, and that finally the parts of the molding core are pulled out completely by their legs from the hollow molded body.

Preferably the hollow molded body is formed around the molding core by injection die casting or injection molding. In making the hollow molded body in this manner the brittle molding core, which is preferably made of a synthetic material, such as plastic, is placed in suitably designed recesses in the matrix of the opened molding implement. Similar recesses are formed in the other half of the matrix which will clamp the molding core in tightly after the implement has been closed. Thereupon the preparation for the hollow molded body is injected into the shape-imparting hollow of the matrix by means of casting channels through one or more casting openings.

In this method of injection any desired disposition and distribution of the casting openings may be selected for larger molding core diameters or for larger inside cross sections of the hollow molded body. Thus, for instance, injection may be carried out on the legs or at right angles to the principal plane of the molding core in the symmetrical center. However, in making hollow molded bodies that have relatively long legs and relatively small inside cross sections, that is, particularly in making pipe manifolds or hose manifolds, difficulties may possibly arise in the stabilization of the molding core. Despite the fact that the molding core is clamped tightly all around at its ends in the matrix, it is not possible under the high pressure and temperature prevailing during the injection procedure to prevent the molding core from arching slightly, and therefore it is no longer positioned precisely in the principal plane of the hollow molded body that is being made. Consequently, hollow molded bodies are produced which have undesired unequal wall thicknesses.

These problems may be prevented by carrying out the injection through a number of lateral casting openings which are symmetrically disposed around the predetermined breaking point of the molding core and have a narrow slot-like inside apertural cross section which is disposed t right angles to the principal plane of the molding core and symmetrically thereto, and whose height is at least equal to the diameter of the molding core at this point and at most equal to the outside diameter of the hollow molded body at this point.

For carrying out this method in accordance with the invention a molding core is used which is characterized by the fact that it is made in one piece, consists of a brittle material, and has one or more predetermined breaking points which are so disposed that after being broken at these points the molding core may be completely withdrawn by its legs from the hollow molded body.

According to a further embodiment of the invention, the molding core preferably consists of a thermoplastic or duroplastic material.

The method and the molding core of the invention are preferably used for mass producing pipe manifolds, particularly double-tee, T-, and Y-manifolds from an elastic material or a soft thermoplastic. Such manifolds are preferably used in the techniques of regulating and adjusting sub-atmospheric negative, sub-atmospheric or low pressures, particularly in the automotive industry, and in laboratory technology. In laboratory technology they are particularly suitable in places where, on the one hand, stresses can readily arise in the design of piping, and on the other hand where for reasons of corrosion and diffusion only the least possible and the shortest possible section of hoses may be used.

Preferably the molding core consists of plastic or other synthetic material, but it may also consist of brittle, inorganic or metallic materials. For mass production, molding cores made of a brittle plastic material with a relatively high softening point are preferred. For series production with high requirements as to dimensional accuracy, molding cores made of glass are used to advantage. Molding cores of this type produce elastic hollow molded bodies with particularly smooth inner surfaces. For hollow molded bodies with relatively large inside diameters and rather high requirements for dimensional accuracy metallic brittle hollow cores may also be used. But the basic advantage of the invention is to be found in the field of mass producing flexible bend headers and manifolds with inside diameters of millimetric dimensions.

The predetermined breaking points can be designed as geometric attenuation points or attenuation points caused by the material. Geometric attenuation points are, in particular, necked-down areas which are preferably so designed that the smallest molding core diameter of the necked-down portion amounts to at least 75% of the molding core diameter at the adjacent points. Depending upon the material of which the molding core is made, the necked-down portion or geometric attenuation may also be shallower. The shallower the attenuation is, the smaller will be the flow resistance that arises in the manufactured hollow molded body. But the attenuation must be at least deep enough to guarantee a clean break at the predetermined breaking point.

Particularly in those applications in which a reduction in the inside diameter of the flexible hollow molded body is not acceptable under any circumstances, the predetermined breaking point is preferably designed as a material attenuation in the molding core. Depending upon the type of material that is used for the molding core, depolymerization, recrystallization, or a change in texture may be used.

In principle any flexible elastic materials and plastic natural and synthetic materials which can be molded on molding cores may be used as the material for the hollow molded body. With regard to mass production, the substances used as work materials are rubber mixtures, namely both completely synthetic rubber mixtures and also synthetic rubber mixtures with some proportion of natural rubber, and plastic or elastic soft thermoplastics, more particularly, Soft PVC.

The most varied methods may be used for building up the material of the hollow molded body around the molded core, depending upon the requirements of each individual case. For example, the material may be applied by molding or injection in a matrix, by the immersion method or the centrifugal immersion method. In consideration of cheap mass production, injection methods and immersion methods are preferred.

The invention will be more fully described with the aid of exemplifying embodiments in connection with the accompanying drawings in which:

FIG. 1 is a schematic view showing the location of the predetermined breaking point of a molding core for making a doubletee manifold;

FIG. 2 and 2a are, respectively, a schematic view showing a molding core for making a Y-manifold and a side view in the principal plane of the molding or hollow molded body (Y-manifold) core taken in the direction of the arrow II of FIG. 2 showing the location of the cast-on burr on the finished manifold;

FIG. 3 is a schematic view showing the location of the predetermined breaking point of a molding core for making a bend;

FIG. 7 shows an exemplifying embodiment for a molding core of the type shown in FIG. 4.

Figure 4:
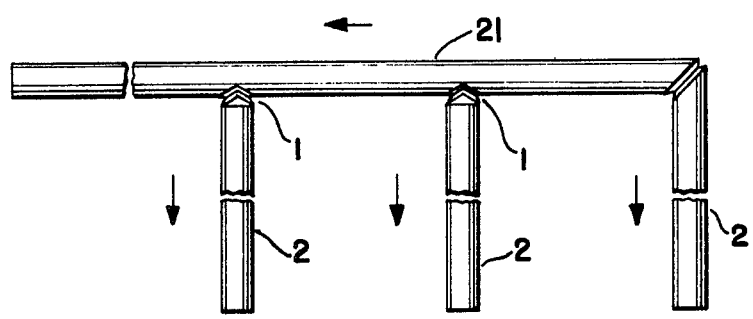
FIG. 4 is a schematic view showing the location of predetermined breaking points in a molding core for making a manifold that has four connection openings.

FIG. 1 schematically illustrates the location of the predetermined breaking point 1 in a molding core of the invention for making a flexible double-tee manifold. The predetermined breaking point is located in the symmetrical center of the molding core and is so designed that when bending stress is applied at the breaking point, the core will break and form four rodlike legs 2. The legs can be withdrawn in the direction indicated by the arrows from the hollow molded body (not shown) that has been molded around the core. Due to the fact that the molding core is made in one piece even in the self-intersection point of the two main axes of the molding core, the formation of partitions in the course of molding the hollow body is reliably prevented.

FIG. 2 schematically illustrates the location and construction of the predetermined breaking point 1 for a molding core for making a Y-manifold. The predetermined breaking point is so designed in the symmetrical center of the molding core that when bending stress is applied at right angles to the plane of the drawing in FIG. 2, the molding core will break in such a way that three separate molding core legs 2 are produced which may be pulled out of the casting in the direction indicated by the arrows. By making the molding core in one piece in the forking area of the Y-manifold, while the molding material is being applied around the core, the formation of partitions of molding material is reliably prevented. For instance, Y-manifolds may be made of rubber on a mass production scale without any rejects resulting from interruptions or blockage in the passage.

FIG. 2a shows a Y-manifold (on a reduced scale) made by using the molding core shown in FIG. 2. Symmetrically between the two legs 11 of the Y-manifold the molding burr 12 is shown. For purposes of clarity the showing of molding burr 12 is not to scale, but is somewhat spread out. The design of the burr reproduces the location, direction and shape of the injection opening in the molding implement. As previously described, these burrs or the casting openings by which these burrs are formed are symmetrically disposed around the symmetrical center of the hollow molded body, in this case, the Y-manifold. The Y-manifold shown in FIG. 2a is therefore injected through three injection openings which are disposed at intervals of 120° from one another, between the legs of the molding core (shown in FIG. 2) or the hollow molded body (shown in FIG. 2a). The burrs 12 or the injection openings have the shape of a narrow rectangle or slot at right angles to the principal plane of the molding core or hollow molded body and are symmetrical to the said principal plane. The height of this slot is equal at least to the diameter of the molding core at the injection point and at most to the outside diameter of the hollow molded body at this point. Preferably the injection opening is at least so high that its length will be equal to the sum of the diameter of the molding core and one wall thickness. At both sides of the principal plane of the molding core the slot therefore projects beyond the upper edge and the lower edge of the molding core by a half wall thickness of the hollow molded body. Consequently, when the preparation for the hollow molded body is being injected, a flow-dynamic stabilization of the molding core is assured in the principal plane of the hollow molded body that is to be made, or in the principal plane of the shape-imparting hollow space in the molding tool.

For hollow molded bodies with a different configuration the vertical injection slots are correspondingly distributed around the symmetrical center of the hollow molded body. Thus, for example, the double-tee manifold is preferably injected through four perpendicularly position injection openings which are disposed at an angular interval of 90° from one another and at 45° from the legs of the manifold.

FIG. 3 is a schematic representation of the location of a predetermined breaking point 1 of a molding core which serves for making flexible pipe bends. The predetermined breaking point is preferably designed at right angles to the tangent of the bend that encloses the same angle with both legs 2 of the bend. After the material of the hollow molded body has been molded and the molding core has been broken at the predetermined breaking point and both core legs have been pulled out in the direction indicated by arrows, a hose bend or pipe bend of flexible or rubber-elastic material is obtained through which it is possible to make a flexible bend in a rigid pipeline with only two sealing surfaces without encountering the danger of interrupting or blocking due to kinking the passage in the area of the bend, a danger that exists when rigid hoses are used.

FIG. 4 is a schematic illustration of the three predetermined breaking points 1 of a molding core for making a manifold of more complicated design. The predetermined breaking points for the molding core legs 2 which branch off radially from the horizontal mold are so disposed that these legs may be broken off without weakening the molding core leg 21 which is horizontally disposed in FIG. 4. The molding core leg which is disposed outside at the right of this figure and is connected to the horizontally disposed leg by way of a bend has a predetermined breaking point of the type described in connection with FIG. 3. After the hollow molded body has been molded and the molding core has been broken at the predetermined breaking points, the four resulting molding core legs may be pulled out of the hollow molded body in the direction indicated by arrows in FIG. 4.

A manifold that is made of rubber and has been formed in this way may, for instance, be used in chemical laboratory equipment and in medico-chemical laboratory apparatuses. Hose clamps are all that is needed to regulate the through-flow. The danger of leaks at the branching points is reduced to a minimum.

Figure 5:
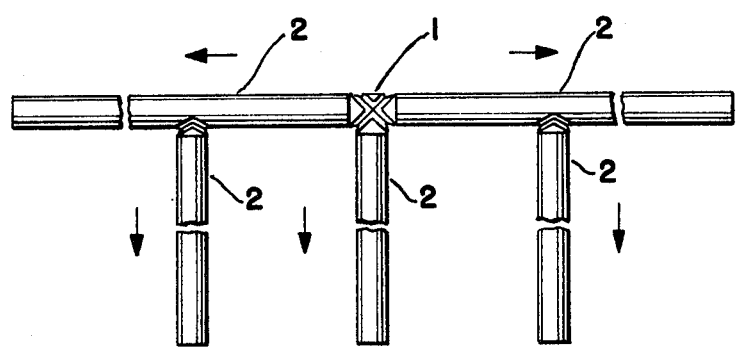
FIG. 5 is a schematic view showing the location of the predetermined breaking points of a molding core for making a manifold with a rectilinear passage and radial branch lines.

FIG. 5 schematically shows the design of a manifold that is similar to the design shown in FIG. 4. In contrast to the design shown in FIG. 4, FIG. 5 shows a molding core by which manifolds are obtained which are open to both sides in the horizontal direction. Radial branch lines branch off from this main line. In contrast to the design shown in FIG. 4, in the design of the manifold of FIG. 5 a predetermined breaking point 1 is so disposed in the principal symmetrical center of the molding core that the horizontal leg of the molding core may also be broken into two pieces. After the hollow molded body has been molded and the molding core has been broken at the predetermined breaking point, the five molding core legs 2 may be freely and completely withdrawn from the hollow molded body. When a rubber mixture is used as the material for the hollow molded body, a one-piece section of rubber hose will be obtained in this manner with a straight passage and branch lines branching off at right angles therefrom. Therefore, for example, with such a manifold five rigid pipelines made, for instance, of glass or polyamide, may be flexibly connected to one another completely free of tensions and with a high degree of impermeability or tightness. Five connecting points or sealing surfaces are required for this. If it were desired to make a similar line system in the traditional manner by using three T-headers made of a rigid material such as glass tubing by inserting pieces of rubber hosing therebetween, 14 connecting points or sealing points would be required if the individual T-members were connected directly to one another by a piece of hose, and 18 connecting points would be required if the individual T-members were connected to one another with flexible transition elements with rigid tube pieces inserted therebetween. Compared to this, the advantage of using a manifold that is made in one piece is quite obvious. By designing the one-piece brittle molding cores with predetermined breaking points, the invention creates the prerequisite for the fact that such manifolds made, for example, of rubber or of Soft PVC or some similar soft elastic thermoplastics, can be manufactured in any desired number of pieces in such a way that a free and unobstructed connection between the individual cored hole sections of the hollow molded body will be assured under all circumstances.

Example 1

Figure 6:
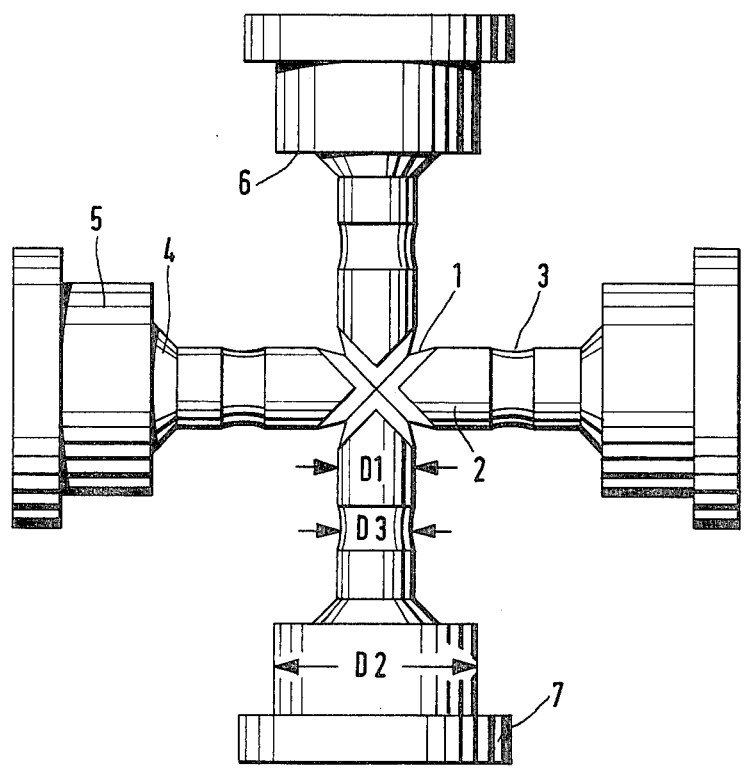
FIG. 6 shows an exemplifying embodiment for a molding core of the type shown in FIG. 1.

For making a rubber-elastic double-tee manifold, the molding core shown in FIG. 6 is made from a glass-fiber-reinforced polyamide-6 in a known manner by injection die casting. In its symmetrical center the core has a predetermined breaking point 1 designed as a geometric attenuation. The four molding core legs 2 which are disposed in one plane and are always at right angles to one another meet in the predetermined breaking point. The diameter D1 of the cylindrical molding core leg 2 is 3.5 mm. The radial diameter at the weakest point of attenuation point 1 is 3.0 mm. Each molding core leg 2 is provided at its outer extremity with a shallow annular groove 3 which serves for the formation of a sealing bulge in the manifold. The cylindrical portion of each molding core leg 2 passes over into a frustoconical end portion 4 which serves to form a bevel on the manifold. The height of this frustoconical portion is 1 mm, and the aperture angle is 45° relative to the center line.

On the outside of this frustoconical transition piece another cylindrical section 5 is disposed. The diameter D2 is obviously greater than the largest diameter of the frustoconical transition element 4. The inwardly directed surface 6 of cylindrical section 5 forms the end plane of the manifold and is sealed off against the matrix. Alternatively, however, diameter D2 may be equal to the largest diameter of the frustoconical transition piece which forms the bevel. Then the end plane of the manifold is formed in the matrix alone. In the exemplifying embodiment shown in FIG. 6, the diameter D2, which defines the outside diameter of the manifold, is 9 mm.

A gripper element 7 is attached outwardly to cylindrical section 5. After the molding core has been broken at predetermined breaking point 1, the individual molding core legs may be withdrawn from the double-tee manifold by machine or by hand. In order not to make this withdrawal difficult because of material attenuation or hindrance in sliding, annular groove 3 for forming the sealing bulge is made as shallow as possible. Diameter D3 is 2.8 to 2.9 mm, while the width of annular groove 3 is likewise 1 to 2 mm, depending upon the material being used for the hollow molded body.

The molding core thusly made of polyamide-6 is placed into a conventional two-piece matrix which is in the form of two intersecting cylinders with 9 mm diameter. After the mold is closed, a rubber mixture is injected at a pressure of approximately 2.6 kN/cm². The rubber mixture is an ethylene-propylene-terpolymerizate caoutchouc (APTK) whose third terpolymerizate component is a diene, preferably a butadiene.

After the mold is opened, the molded body containing the molding core may be removed by hand or be dumped out of the mold, or it may be ejected automatically out of the mold in such a way that the molding core will break at the predetermined braking point simultaneously with and due to the dumping operation. Then in automatic manufacturing a grabber which is operatively connected with the mold engages gripping elements 7 practically at the same time, so that when the double-tee manifold is ejected from the injection mold, the molding core is removed simultaneously, and the finished end product is ejected from the machine.

When manufacturing by hand one may, for example, proceed in such a way that one removes the double-tee manifold from the mold with the still unbroken molding core, and then breaks the molding cores by gently bending them by hand at the predetermined breaking point 1 and simultaneously grasping the gripping elements 7 in order to withdraw the legs of the molding core from the legs of the double-tee manifold.

The thusly obtained double-tee manifold whose beam length from one outside face to the opposite outside face may, for instance, by 80 mm, exhibits this advantage when compared to all of the rubber-elastic manifolds that are made according to conventional methods, that it guarantees an open passage at the point of intersection of the two rectilinear cylindrical hollow chambers under all conditions and at all times. Furthermore, the critical connecting point or the point of intersection is injected in one piece. In this way the necessary tightness and mechanical resistance are assured. Connection to the rigid pipelines which the manifold connects with one another is effected by simply pushing the opening of the manifold over the open pipe ends. The introduction of the pipe end is facilitated by the beveled construction. According to all standards, the seal is adequately guaranteed by the internally molded-on sealing bulge. If necessary, when the connection is being made, supplementary conventional hose clamps may be applied.

In the unstressed state the four legs of the double-tee manifold are at right angles to one another in one plane. But the use of a rubber-elastic material for making this double-tee makes it possible to bend the legs in place in practically any direction, without running the risk of blocking the passage by kinking. Thus, for example, two pairs of lines that face coaxially opposite one another in one plane may be connected crosswise, i.e., in crossover fashion, with one another; these pairs of conduits may be connected with one another when, in the principally identical position, their planes are at right angles to one another; one conduit may be branched to three conduits that are parallel to one another and are opposite the face of the one line; four lines whose openings are disposed in one plane may be connected crosswise with one another as long as the center points of these line openings are always about 15 mm from one another; and any other desired spatial distributions may be employed against the rubber-elastic resilient force of the double-tee manifold.

A further basic advantage of the rubber-elastic double-tee manifold made thusly in one piece resides in the fact that the lines need no longer be assembled in situ at difficult places for assembly, such as confined instrument housings or unfavorable corners of automotive vehicle bodies. Indeed, the connection may comfortably be made outside of the housing or the automobile body and the elastic distributing point that has been produced and connects the rigid pipelines with one another may then be pushed into the inaccessible place in the housing or automobile body. Here there need be no fear of blocking the passage by kinking of the elastic manifold, nor is there any danger of disengagement of the connections. The one-piece construction of the molding core in making the manifold furthermore guarantees that even when there is a change in the cross section of the distributor manifold, no rubber membrane formed at intersections will narrow or even close off the passage through the manifold.

Example 2

FIG. 7 shows an exemplifying embodiment of a molding core of the type shown in FIG. 4. The reference numerals used in FIG. 7 designate the same parts as those described in connection with the description of FIG. 6. In the showing of FIG. 7 the cylindrical end member 5 connected at the lefthand outer end of cylindrical molding core leg 21 to the outside of frustoconical transition element 4 has a diameter that is equal to the largest diameter of cylindrical transition element 4 which forms the bevel. In this design the front end of the hollow molded body is molded by the matrix which encompasses the cylindrical end member 5 in a sealing manner. Whereas molding core leg 21 has an annular groove 3 for forming the internal sealing bulge of the manifold, the radial molding core legs 2 are provided with a series of frustoconical mold sections unidirectionally disposed one above the other which forms internally disposed gaskets in the molded manifold in known manner.

The molding core shown in FIG. 7 is made in known manner by the injection molding of glass-fiber-reinforced polyamide-6.6.

In the previously described manner the manifold is molded by injecting Soft-PVC into an appropriately fashioned matrix. After cooling, the hollow molded bydy is removed from the mold with the core and the core is broken at the predetermined breaking points either manually or mechanically. Preferably the bending force which produces the break acts axially to the molding core leg 21 — that is, at right angles to the axis of molding core leg 2 — upon radial molding core legs 2. The thusly broken core is then pulled out of the hollow molded body in the manner shown in FIG. 4.

The thusly obtained manifold is particularly distinguished by the fact that even in mass production it can be guaranteed that all the connecting legs of the manifold communicate freely with one another. The passages are not narrowed down or cut off by any separating membranes or partitions. Since the connecting points are not welded or subsequently, but rather are extruded in one-piece manner, they exhibit a great imperviousness or tightness and great mechanical resistance. Manifolds of this type may be used in numerous laboratory instruments of the most varied types, for instance, in gas or liquid chromatographs or in orsat apparatuses. For the manufacturer of such equipment they facilitate the installation, and for the user they facilitate possible cleaning, and due to their great flexibility and the low number of sealing points, they increase the service life of the branching structure. These obvious advantages could not be put to use previously since neither a method nor a device was available for the mass production of the necessary flexible manifolds.

It was found that the basic advantage of the invention resides in affording anyone skilled in the most varied arts the possibility for freer construction of flexible branches, transition pieces, conduits for rigid pipelines, more particularly for rigid pipelines with rather small diameters, since the result of the invention the necessary flexible connecting pieces and manifolds can be manufactured cheaply and economically in large and very large quantities while for the first time guaranteeing completely open connections.

In the appended claims, the term "injection molding" includes all methods in which plastic material is injected, such as injection die casting or injection molding, to form a flexible pipe manifold. The term "plastic" as used in the appended claims means capable of being molded or modeled.

Having described presently preferred embodiments of the invention it is to be understood that it may otherwise be embodied within the scope of the appended claims.

I claim:

1. A method for making a flexible pipe manifold having a free passage therethrough comprising: injection molding a plastic material around a brittle one-piece molding core containing at least one predetermined breaking point; after the removal of the manifold from the mold bending the hollow molded body in such a way that the molding core breaks into parts at the predetermined breaking point; and finally withdrawing the parts of the molding core completely from the manifold providing a free passage therethrough.

2. A method as set forth in claim 1 in which the molding core breaks into parts having legs and the parts are withdrawn completely from the flexible pipe manifold by their legs.

3. The method as set forth in claim 1 wherein the flexible pipe manifold is made out of one of an elastic and soft thermoplastic material.

4. A method for making a flexible pipe manifold according to claim 1 wherein the body is built up by injecting material through a number of lateral casting openings which are symmetrically arranged about the predetermined breaking point of the molding core and have a narrow slot-like apertural cross-section disposed at right angles to the principal plane of the molding core and symmetrically thereto, and whose height is at least equal to the diameter of the molding core at this point and is at most equal at this point to the outside diameter of the hollow molded body that is to be made.

5. The method as set forth in claim 4 wherein the flexible pipe manifold is made out of one of an elastic and soft thermoplastic material.

6. A molding core for making a flexible pipe manifold characterized by the fact that the molding core is in one piece, comprises a brittle material, and has at least one predetermined breaking point which is so disposed that after breaking, the molding core may be withdrawn completely at this point from the manifold providing a free passage therethrough.

7. A molding core according to claim 6, characterized by the fact that the material consists of one of a thermoplastic and a duroplastic material.

8. A molding core as set forth in claim 6 having a plurality of predetermined breaking points which are so disposed that after breaking, the molding core may be withdrawn completely at these points from the manifold.

9. A molding core as set forth in claim 6 wherein, after breaking, the molding core is in parts having legs and the molding core may be withdrawn completely from the manifold by the legs.

10. The molding core as set forth in claim 6 wherein the flexible pipe manifold is made out of one of an elastic and soft thermoplastic material.

* * * * *

UNITED STATES PATENT AND TRADEMARK OFFICE
CERTIFICATE OF CORRECTION

PATENT NO. : 4,094,688

DATED : June 13, 1978

INVENTOR(S) : Franz-Josef Wolf

It is certified that error appears in the above-identified patent and that said Letters Patent are hereby corrected as shown below:

In the listing of Foreign Application Priority Data:

"Japan" should read --Germany--.

Column 3 Line 22 "t" should read --at--.
Column 7 Line 65 After "with" insert --a--.
Column 9 Line 30 "forms" should read --form--.
Column 9 Line 39 "bydy" should read --body--.
Column 9 Line 52 "or" should read --on--.
Column 10 Line 2 After "since" insert --as--.

Signed and Sealed this

Fourteenth Day of November 1978

[SEAL]

Attest:

RUTH C. MASON
Attesting Officer

DONALD W. BANNER
Commissioner of Patents and Trademarks